3,576,030
ALKYLDIPHENYLSILANES
Richard W. Alsgaard, Midland, Mich., assignor to Dow Corning Corporation, Midland, Mich.
No Drawing. Filed Aug. 15, 1968, Ser. No. 752,777
Int. Cl. C07f 7/08, 7/18
U.S. Cl. 260—448.2    5 Claims

ABSTRACT OF THE DISCLOSURE

Alkyldiphenylacetoxysilanes and alkyldiphenylmethoxysilanes in which the alkyl group has from 12 to 45 inclusive carbon atoms are disclosed. The alkyldiphenylsilanes are useful as evaporation retardants.

---

This invention relates to alkyldiphenylsilanes.

An object of the present invention is to provide a new class of alkyldiphenylsilanes which are useful as evaporation retardants.

This invention relates to an alkyldiphenylsilane of the formula $$(C_nH_{2n+1})\underset{\underset{(C_6H_5)_2}{|}}{Si}X$$

in which X is selected from the group consisting of an acetoxy radical and a methoxy radical and $n$ is an integer of from 12 to 45 inclusive.

The alkyldiphenylsilanes of the present invention can best be prepared by reacting an α-olefin with $$H(C_6H_5)_2SiCl$$

in the presence of a platinum catalyst, such as chloroplatinic acid. The resulting product has a formula $$(C_nH_{2n+1})\underset{\underset{(C_6H_5)_2}{|}}{Si}Cl$$

This chlorosilane is mixed with sodium acetate to produce the corresponding acetoxysilane of the formula $$(C_nH_{2n+1})\underset{\underset{(C_6H_5)_2}{|}}{Si}O\!-\!\!\overset{\overset{O}{\|}}{C}CH_3$$

and the chlorosilane is mixed with methanol to produce the corresponding methoxysilane of the formula $$(C_nH_{2n+1})\underset{\underset{(C_6H_5)_2}{|}}{Si}OCH_3$$

The α-olefin can be any alkene which has a carbon-carbon double bond at a terminal carbon atom and has 12 to 45 carbon atoms. The α-olefins can be either straight chained or branched and include, for example, α-dodecene, α-pentadecene, α-octadecene, α-nonadecene, $$CH_2\!=\!CH(CH_2)_{20}CH_3$$
$$CH_2\!=\!CH(CH_2)_6CH(CH_3)(CH_2)_8CH_3$$
$$CH_2\!=\!C(CH_2CH_2CH_3)(CH_2)_{12}CH_3$$
$$CH_2\!=\!CH(CH_2)_{26}CH_3,\ CH_2\!=\!CH(CH_2)_{42}CH_3$$
$$CH_2\!=\!CH(CH_2)_{21}CH_3$$
$$CH_2\!=\!CH(CH_2)_{12}CH(CH_3)(CH_2)_5C(CH_3)_2(CH_2)_7CH_3$$
$$CH_2\!=\!CH(CH_2)_{17}CH_3\ \text{and}\ CH_2\!=\!CH(CH_2)_{19}CH_3$$

The alkyldiphenylsilanes of the present invention can include, for example, $$CH_3(CH_2)_{11}\underset{\underset{(C_6H_5)_2}{|}}{Si}O\!-\!\!\overset{\overset{O}{\|}}{C}CH_3$$

$$CH_3(CH_2)_{12}\underset{\underset{(C_6H_5)_2}{|}}{Si}O\!-\!\!\overset{\overset{O}{\|}}{C}CH_3$$

$$CH_3(CH_2)_{16}\underset{\underset{(C_6H_5)_2}{|}}{Si}O\!-\!\!\overset{\overset{O}{\|}}{C}CH_3$$

$$CH_3(CH_2)_{17}\underset{\underset{(C_6H_5)_2}{|}}{Si}O\!-\!\!\overset{\overset{O}{\|}}{C}CH_3$$

$$CH_3(CH_2)_{44}\underset{\underset{(C_6H_5)_2}{|}}{Si}O\!-\!\!\overset{\overset{O}{\|}}{C}CH_3$$

$$CH_3(CH_2)_{11}\underset{\underset{(C_6H_5)_2}{|}}{Si}OCH_3$$

$$CH_3(CH_2)_{12}\underset{\underset{(C_6H_5)_2}{|}}{Si}OCH_3$$

$$CH_3(CH_2)_{15}\underset{\underset{(C_6H_5)_2}{|}}{Si}OCH_3$$

$$CH_3(CH_2)_{17}\underset{\underset{(C_6H_5)_2}{|}}{Si}OCH_3$$

$$CH_3(CH_2)_{22}\underset{\underset{(C_6H_5)_2}{|}}{Si}O\!-\!\!\overset{\overset{O}{\|}}{C}CH_3$$

$$CH_3(CH_2)_{13}\underset{\underset{(C_6H_5)_2}{|}}{Si}OCH_3$$

$$CH_3(CH_2)_{44}\underset{\underset{(C_6H_5)_2}{|}}{Si}OCH_3$$

$$CH_3(CH_2)_{14}\underset{\underset{(C_6H_5)_2}{|}}{Si}O\!-\!\!\overset{\overset{O}{\|}}{C}CH_3$$

$$CH_3(CH_2)_{19}\underset{\underset{(C_6H_5)_2}{|}}{Si}O\!-\!\!\overset{\overset{O}{\|}}{C}CH_3$$

$$CH_3(CH_2)_7C(CH_3)_2(CH_2)_6CH(CH_3)(CH_2)_{14}\underset{\underset{(C_6H_5)_2}{|}}{Si}OCH_3$$

and $$CH_3(CH_2)_{21}\underset{\underset{(C_6H_5)_2}{|}}{Si}O\!-\!\!\overset{\overset{O}{\|}}{C}CH_3$$

The alkyldiphenylsilanes of the present invention are particularly useful as evaporation retardants. The alkyldiphenylsilanes are applied to the surface of an aqueous body which is exposed to a gaseous atmosphere. The amount of alkyldiphenylsilane applied is determined by several factors, such as, temperature of the aqueous body, temperature of the atmosphere above the aqueous body and the movement of the atmosphere or the aqueous body. The amount of the alkyldiphenylsilane is usually applied to provide at least a monomolecular layer on the aqueous surface. However, more or less can be used depending upon the desired results. If one desires to control the rate of evaporation, one can apply less of the alkyldiphenylsilane to provide some specific rate of evaporation which can be used as a means of controlling the temperature of an aqueous body.

The aqueous body can be a swamp, a field covered with water, a pond, a lake, a reservoir, or in a tank, in a ditch, in a dish, in a closed container with a controlled atmosphere and the like.

The alkyldiphenylsilanes can be applied to the aqueous body as is or in the form of an organic solution or by any other means suitable to disperse the compound over the aqueous surface.

The alkyldiphenylsilanes of the present invention retard the evaporation of water.

The following examples are illustrative only and should not be construed as limiting the invention which is properly delineated in the appended claims.

EXAMPLE 1

(A) A mixture of 28 g. of α-octadecene and 5 drops of a one weight percent solution of platinum, as chloroplatinic acid, in isopropanol was warmed to 100° C. and then 21.8 g. of $H(C_6H_5)_2SiCl$ was dropped into it. The reaction was slow and the resulting mixture was maintained at about 100° C. for one day. After one day, 10 g. of additional α-octadecene and 5 additional drops of the platinum solution were added. The resulting mixture was heated to 150° C. and then 5 more drops of the platinum solution were added. The resulting mixture was heated until only a trace of silicon-bonded hydrogen could be detected. The product was $C_{18}H_{37}(C_6H_5)_2SiCl$ and was obtained by removing the volatiles by distillation at reduced pressure.

(B) A portion of the $C_{18}H_{37}(C_6H_5)_2SiCl$ was dissolved in acetone and excess sodium acetate was added. The resulting mixture was agitated and then the sodium chloride and remaining sodium acetate were filtered from the solution. The solution was distilled to remove the acetone. The product was

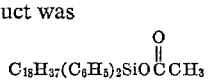

and had a refractive index, $n_D^{25}$ of 1.5104.

(C) Another portion of the $C_{18}H_{37}(C_6H_5)_2SiCl$ was mixed with methanol and allowed to stand for 64 hours. The remaining methanol was stripped from the reaction mixture and $C_{18}H_{37}(C_6H_5)_2SiOCH_3$ was obtained which had a refractive index, $n_D^{25}$ of 1.5151.

(D) Ten weight percent solutions of octadecyldiphenyl acetoxysilane in diethyl ether and octadecyldiphenylmethoxysilane in diethyl ether were prepared. Ten drops of each of these two ether solutions were placed on the surface of 100 g. of tap water in a 250 ml. stainless steel cup. The resulting assembly was placed in a controlled atmosphere of 65% relative humidity at 68° F. The weight of the cup, water and ether solution was initially made and then observed at time intervals of 1 day, 2 days, 5 days and 7 days. A control cup was also placed in the controlled atmosphere. The control was prepared as above but without any silane solution. A solution was prepared as described above except octadecyldiphenylisopropoxysilane was used in place of either

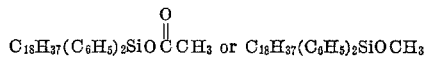

This particular solution was used as a comparison to show the unique properties of the alkyldiphenylsilanes of the present invention.

The results below are the weight percentages of water lost in a given period of time under the test conditions.

| | | Percent water loss after— | | | | Percent decrease over control |
|---|---|---|---|---|---|---|
| | Compound | 1 day | 2 days | 5 days | 7 days | |
| 1 | Control | 7.3 | 14.7 | 35.0 | 47.2 | |
| 2 | $C_{18}H_{37}\overset{(C_6H_5)_2}{\underset{\,}{Si}}O\overset{O}{\underset{\,}{C}}CH_3$ | | 6.7 | 25.8 | 39.2 | 16.9 |
| 3 | $C_{18}H_{37}\overset{(C_6H_5)_2}{\underset{\,}{Si}}OCH_3$ | 5.4 | 12.1 | 27.2 | 40.7 | 13.7 |
| 4 | $C_{18}H_{37}\overset{(C_6H_5)_2}{\underset{\,}{Si}}OCH(CH_3)_2$ | 6.9 | 15.5 | 35.9 | 52.4 | −11.0 |

EXAMPLE 2

When the following olefins are reacted with $H(C_6H_5)_2SiCl$ and the processes described in Example 1 are carried out, the products as shown in the following table are obtained.

| Olefin | Product obtained by method of Example 1 (B) | Product obtained by method of Example 1 (C) |
|---|---|---|
| $CH_2=C(CH_2CH_2CH_3)(CH_2)_{12}CH_3$ | $CH_3(CH_2)_{12}\overset{CH_3CH_2CH_2}{\underset{\,}{C}}HCH_2\overset{(C_6H_5)_2}{\underset{\,}{Si}}O\overset{O}{\underset{\,}{C}}CH_3$ | $CH_3(CH_2)_{12}\overset{CH_3CH_2CH_2}{\underset{\,}{C}}HCH_2\overset{(C_6H_5)_2}{\underset{\,}{Si}}OCH_3$ |
| $CH_2=CH(CH_2)_{16}CH_3$ | $CH_3(CH_2)_{18}\overset{(C_6H_5)_2}{\underset{\,}{Si}}O\overset{O}{\underset{\,}{C}}CH_3$ | $CH_3(CH_2)_{18}\overset{(C_6H_5)_2}{\underset{\,}{Si}}OCH_3$ |
| $CH_2=CH(CH_2)_{17}CH_3$ | $CH_3(CH_2)_{19}\overset{(C_6H_5)_2}{\underset{\,}{Si}}O\overset{O}{\underset{\,}{C}}CH_3$ | $CH_3(CH_2)_{19}\overset{(C_6H_5)_2}{\underset{\,}{Si}}OCH_3$ |
| $CH_2=CH(CH_2)_{26}CH_3$ | $CH_3(CH_2)_{28}\overset{(C_6H_5)_2}{\underset{\,}{Si}}O\overset{O}{\underset{\,}{C}}CH_3$ | $CH_3(CH_2)_{28}\overset{(C_6H_5)_2}{\underset{\,}{Si}}OCH_3$ |
| $CH_2=CH(CH_2)_{12}CH_3$ | $CH_3(CH_2)_{14}\overset{(C_6H_5)_2}{\underset{\,}{Si}}O\overset{O}{\underset{\,}{C}}CH_3$ | $CH_3(CH_2)_{14}\overset{(C_6H_5)_2}{\underset{\,}{Si}}OCH_3$ |
| $CH_2=CH(CH_2)_{21}CH_3$ | $CH_3(CH_2)_{23}\overset{(C_6H_5)_2}{\underset{\,}{Si}}O\overset{O}{\underset{\,}{C}}CH_3$ | $CH_3(CH_2)_{23}\overset{(C_6H_5)_2}{\underset{\,}{Si}}OCH_3$ |
| $CH_2=CH(CH_2)_{20}CH_3$ | $CH_3(CH_2)_{22}\overset{(C_6H_5)_2}{\underset{\,}{Si}}O\overset{O}{\underset{\,}{C}}CH_3$ | $CH_3(CH_2)_{22}\overset{(C_6H_5)_2}{\underset{\,}{Si}}OCH_3$ |
| $CH_2=CH(CH_2)_{9}CH_3$ | $CH_3(CH_2)_{11}\overset{(C_6H_5)_2}{\underset{\,}{Si}}O\overset{O}{\underset{\,}{C}}CH_3$ | $CH_3(CH_2)_{11}\overset{(C_6H_5)_2}{\underset{\,}{Si}}OCH_3$ |
| $CH_2=CH(CH_2)_{42}CH_3$ | $CH_3(CH_2)_{44}\overset{(C_6H_5)_2}{\underset{\,}{Si}}O\overset{O}{\underset{\,}{C}}CH_3$ | $CH_3(CH_2)_{44}\overset{(C_6H_5)_2}{\underset{\,}{Si}}OCH_3$ |

That which is claimed is:
1. An alkyldiphenylsilane of the formula

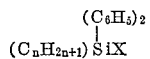

in which X is selected from the group consisting of an acetoxy radical and a methoxy radical and $n$ is an integer of from 12 to 45 inclusive.

2. The alkyldiphenylsilane in accordance with claim 1 wherein X is an acetoxy radical.

3. The alkyldiphenylsilane in accordance with claim 1 wherein X is a methoxy radical.

4. The alkyldiphenylsilane in accordance with claim 2 in which $n$ is 18.

5. The alkyldiphenylsilane in accordance with claim 3 in which $n$ is 18.

References Cited

UNITED STATES PATENTS 2,510,853   6/1950   Barry et al. _____ 260—448.2

TOBIAS E. LEVOW, Primary Examiner

P. F. SHAVER, Assistant Examiner

U.S. Cl. X.R.

260—448.8R